L. L. AMSPACKER.
RIVETER.
APPLICATION FILED OCT. 20, 1909.
952,595.
Patented Mar. 22, 1910.
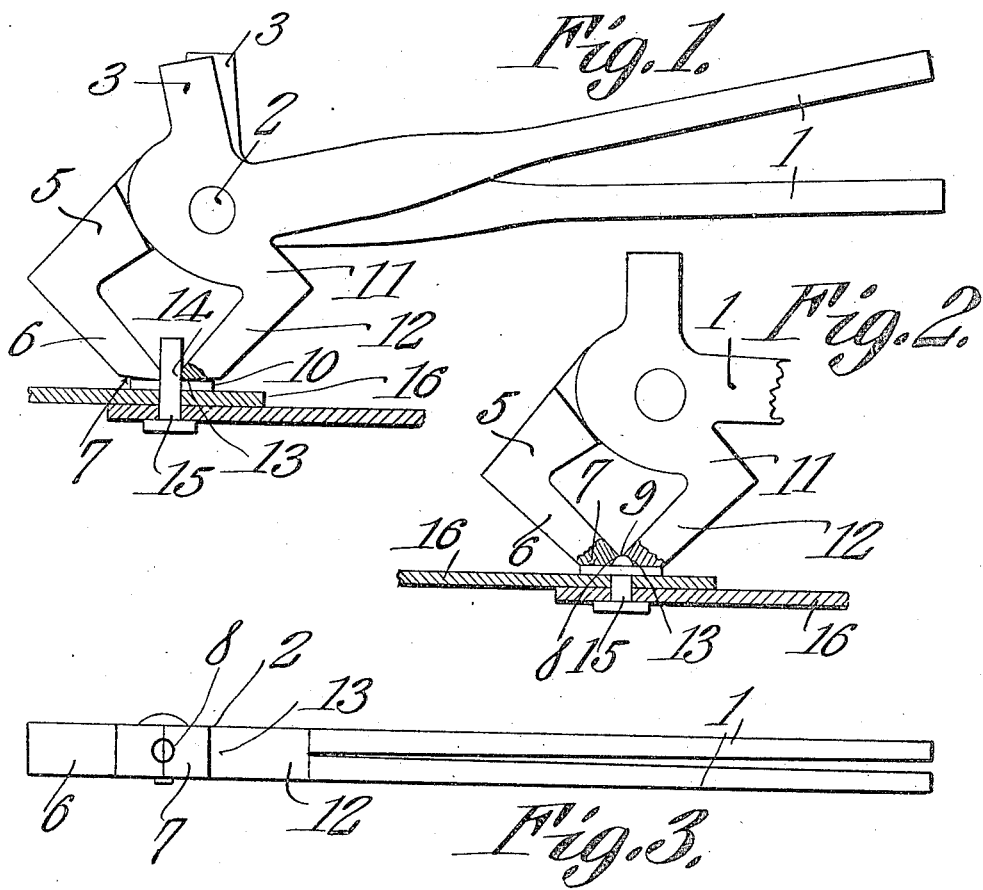
Inventor
Lemmet L. Amspacker.
Witnesses
By
Attorneys

UNITED STATES PATENT OFFICE.

LEMMET L. AMSPACKER, OF GLASCO, KANSAS.

RIVETER.

952,595.   Specification of Letters Patent.   Patented Mar. 22, 1910.

Application filed October 20, 1909. Serial No. 523,642.

*To all whom it may concern:*

Be it known that I, LEMMET L. AMS-PACKER, a citizen of the United States, residing at Glasco, in the county of Cloud and State of Kansas, have invented a new and useful Riveter, of which the following is a specification.

This invention is a riveting tool and the object of the device is to provide a simple and efficient tool by the use of which rivets may be cut off close to the washer and upset rapidly and thoroughly.

The stated object of the invention is attained in the use of the device illustrated in the accompanying drawings, and the invention consists in certain novel features of the same which will be hereinafter fully described and claimed.

In the said drawings, Figure 1 is a side elevation of my improved tool in position upon a rivet as it appears before the rivet has been cut. Fig. 2 is a similar view of the operative part of the device showing the tool in position for upsetting the rivet. Fig. 3 is a bottom plan view of the tool. Fig. 4 is a top plan view thereof, and Fig. 5 is an end elevation of the same.

A tool constructed in accordance with my invention comprises two lever or handle members 1—1 which are fulcrumed together at 2 and are provided above the said fulcrum with similar heads or projections 3 adapted when the handles are brought together to form a continuous angular surface, as shown at 4, adapted to receive the blows of a hammer or other instrument whereby the pressure necessary to upset the end of the rivet may be applied thereto. Beyond its fulcrum one of the members is extended, as at 5, and then bent backward to form a working jaw 6 having a flat end portion 7 with a concave notch 8 in its inner edge, the said notch terminating in a cutting edge indicated at 9. The flat portion 7 is adapted to rest squarely against the washer 10 around the rivet while the concave recess 8 will fit over the severed end of the rivet and thereby form a surface to engage the same and shape the upset portion thereof. The coacting member of the tool is carried backward and downward from the fulcrum point, as indicated at 11, and then forward to form a jaw 12 similar to the jaw 6 and having a similar concave notch or recess 13 terminating in a cutting edge 14, as clearly shown in Fig. 1.

It is thought that the operation and advantages of my device will be readily understood and appreciated from the foregoing description, taken in connection with the accompanying drawings.

The rivet 15 is inserted through the parts 16 which are to be connected in the usual manner and the washer 10 is slipped over the end of the rivet, as shown, and as will be readily understood. The jaws 6 and 12 are then caused to fit against the opposite sides of the rivet with their flat surfaces bearing upon the washer 10 and the lever handles 1 are brought together thereby forcing the washer tightly against the leather and causing the cutting edges of the jaws to partly sever the rivet close to the washer and meet over the severed end, as clearly shown in Fig. 2. This movement will bring the projections 3—3 into the same transverse plane, as shown clearly in Figs. 2 and 4, and a blow or series of blows may then be delivered upon the said heads or projections so as to transmit through the jaws the force necessary to cut off the rivet and to upset the end of the same, as will be readily understood.

The device is exceedingly simple in its construction and may be consequently manufactured at a slight cost while in operation it will be found very efficient for the purposes for which it is designed.

Having thus described my invention, what I claim is:

1. A riveting tool comprising two members pivoted together and provided at one side of the pivot with jaws having concave notches in their edges, said notches terminating in cutting edges, and the member being provided at the opposite side of the pivot with projections adapted when brought together to constitute a blow-receiving head.

2. A riveting tool comprising two members pivoted together and having handle portions and heads projecting from the said handle portions at one side of the pivot, the members being provided at the opposite side of the pivot with reversely arranged coacting jaws each having a flat bearing surface at its end and provided in its inner edge with a cutting edge and a concave recess extending from the said cutting edge to the flat bearing surface.

In testimony that I claim the foregoing as my own, I have hereto affixed my signature in the presence of two witnesses.

LEMMET L. AMSPACKER.

Witnesses:
A. OTT,
W. H. S. AMSPACKER.